(12) United States Patent
Gavin et al.

(10) Patent No.: US 8,250,884 B2
(45) Date of Patent: Aug. 28, 2012

(54) ROTARY FIBERIZER

(75) Inventors: Patrick M. Gavin, Newark, OH (US);
Richard D. Lawson, Newark, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 462 days.

(21) Appl. No.: 12/053,256

(22) Filed: Mar. 21, 2008

(65) Prior Publication Data

US 2008/0229786 A1      Sep. 25, 2008

Related U.S. Application Data

(60) Provisional application No. 60/919,242, filed on Mar. 21, 2007.

(51) Int. Cl.
*C03B 37/04* (2006.01)
*C03B 37/06* (2006.01)

(52) U.S. Cl. ............... 65/461; 65/454; 65/457; 65/458; 65/459

(58) Field of Classification Search .......... 65/454–461, 65/516–518, 520, 521–523
See application file for complete search history.

(56) References Cited

U.S. PATENT DOCUMENTS

| | | | |
|---|---|---|---|
| 2,609,566 A | 9/1952 | Slayter et al. | |
| 2,949,632 A | 8/1960 | Kleist et al. | |
| 2,981,974 A | 5/1961 | Lévecque et al. | |
| 2,984,864 A | 5/1961 | Lévecque et al. | |
| 2,991,507 A | 7/1961 | Lévecque et al. | |
| 3,007,196 A | 11/1961 | Lévecque et al. | |
| 3,017,663 A | 1/1962 | Lévecque et al. | |
| 3,019,477 A | 2/1962 | Kleist | |
| 3,020,586 A | 2/1962 | Charpentier et al. | |
| 3,078,691 A | 2/1963 | Charpentier et al. | |

(Continued)

FOREIGN PATENT DOCUMENTS

EP      1 491 512       12/2004

(Continued)

OTHER PUBLICATIONS

International Search Report PCT/US2006/024907 dated Oct. 31, 2006.

(Continued)

*Primary Examiner* — Matthew Daniels
*Assistant Examiner* — Jodi C Franklin
(74) *Attorney, Agent, or Firm* — MacMillan, Sobanski & Todd, LLC (57) ABSTRACT

A method of forming fibers from molten mineral material is provided. The method comprising the steps of: rotating a spinner having an orificed peripheral wall, the orificed peripheral wall having a top row of orifices, introducing molten mineral material to the spinner to create a fan of primary glass fibers, creating an annular combustion flow of heated gas and directing the annular combustion flow of heated gas substantially through the primary fibers, creating an annular flow of attenuating air with an annular blower, the annular flow of attenuating air being sufficient to attenuate the primary fibers into secondary fibers, directing the annular combustion flow of heated gas and the annular flow of attenuating air so that they are radially spaced apart at the level of the top row of orifices, and directing the annular combustion flow of heated gas and the annular flow of attenuating air so that they are brought together at a position below the top row of orifices.

5 Claims, 6 Drawing Sheets

U.S. PATENT DOCUMENTS

| | | | |
|---|---|---|---|
| 3,084,380 A | 4/1963 | Lévecque et al. | |
| 3,084,381 A | 4/1963 | Lévecque et al. | |
| 3,084,525 A | 4/1963 | Lévecque et al. | |
| 3,134,145 A | 5/1964 | Miller | |
| 3,152,200 A | 10/1964 | Kleist | |
| 3,152,878 A | 10/1964 | Lévecque et al. | |
| 3,179,507 A | 4/1965 | Levecque et al. | |
| 3,219,425 A | 11/1965 | Stalego | |
| 3,252,777 A | 5/1966 | Lévecque et al. | |
| 3,254,977 A | 6/1966 | Lévecque et al. | |
| 3,295,943 A | 1/1967 | Mabru | |
| 3,304,164 A | 2/1967 | Charpentier et al. | |
| 3,523,774 A | 8/1970 | Kleist | |
| 3,560,179 A | 2/1971 | Kleist | |
| 3,650,716 A | 3/1972 | Brossard | |
| 3,759,680 A | 9/1973 | Kleist et al. | |
| 3,775,076 A | 11/1973 | Pallo | |
| 3,819,345 A | 6/1974 | Battigelli | |
| 4,246,017 A * | 1/1981 | Phillips | 65/461 |
| 4,303,430 A * | 12/1981 | Houston | 65/461 |
| 4,318,725 A * | 3/1982 | Phillips | 65/523 |
| 4,392,878 A * | 7/1983 | Okuma et al. | 65/460 |
| 4,601,742 A | 7/1986 | Kaveh | |
| 4,661,135 A | 4/1987 | Mosnier | |
| 4,670,034 A * | 6/1987 | Goodridge et al. | 65/461 |
| 4,689,061 A | 8/1987 | Britts, II et al. | |
| 4,847,127 A | 7/1989 | Stahl et al. | |
| 4,917,715 A | 4/1990 | Kaveh et al. | |
| 5,015,278 A | 5/1991 | Lee | |
| 5,312,469 A | 5/1994 | Houston | |
| 5,474,590 A | 12/1995 | Lin | |
| 5,514,199 A | 5/1996 | Houpt | |
| 5,688,302 A | 11/1997 | Snyder | |
| 5,743,932 A * | 4/1998 | Houpt et al. | 65/438 |
| 5,846,284 A | 12/1998 | Hinze et al. | |
| 6,167,729 B1 * | 1/2001 | Watton et al. | 65/497 |
| 6,596,048 B1 | 7/2003 | Tuffal et al. | |
| 6,841,098 B1 | 1/2005 | Spurlock | |
| 6,862,901 B1 * | 3/2005 | Otaki et al. | 65/455 |
| 2005/0086977 A1 | 4/2005 | Otaki et al. | |
| 2007/0000286 A1 * | 1/2007 | Gavin et al. | 65/377 |

FOREIGN PATENT DOCUMENTS

| | | |
|---|---|---|
| FR | 2 298 517 | 8/1976 |
| FR | 2 820 736 | 8/2002 |
| GB | 1121466 | 7/1968 |
| WO | WO2006/095231 | 9/2006 |

OTHER PUBLICATIONS

International Search Report dated Jul. 3, 2008 in PCT/US2008/057872.

* cited by examiner

100
ROTARY FIBERIZER

RELATED APPLICATIONS

This application claims the benefit of U.S. Provisional Application No. 60/919,242, filed Mar. 21, 2007, the disclosure of which is incorporated herein by reference.

TECHNICAL FIELD

The present invention relates generally to forming fibers from molten mineral material, such as forming glass fibers from molten glass. More particularly, the present invention relates to an apparatus for manufacturing fibers from the molten mineral material.

BACKGROUND OF THE INVENTION

Fibers of glass and other thermoplastic materials are useful in a variety of applications including acoustical and thermal insulation materials. Common methods for producing glass fibers for use in insulation products involve producing glass fibers from a rotary process. In a rotary process, glass composition is melted and forced through orifices in the outer peripheral wall of a centrifuge, commonly known as a centrifugal spinner, to produce the fibers. One commonly used spinner is generally cup-shaped and has a bottom wall with a central hole, a top opening and an outer peripheral sidewall that curves upward from the bottom wall, forming the top opening. Another commonly used spinner uses a slinger cup to propel the glass composition to the sidewall for fiberization. A drive shaft is used to rotate the spinner and is typically fixed to the spinner with a quill It would be advantageous if spinners could produce fibers more efficiently.

SUMMARY OF THE INVENTION

According to this invention there is provided a method of forming fibers from molten mineral material, the method comprising the steps of: rotating a spinner having an orificed peripheral wall, the orificed peripheral wall having a top row of orifices, introducing molten mineral material to the spinner to create a fan of primary glass fibers, creating an annular combustion flow of heated gas and directing the annular combustion flow of heated gas substantially through the primary fibers, creating an annular flow of attenuating air with an annular blower, the annular flow of attenuating air being sufficient to attenuate the primary fibers into secondary fibers, directing the annular combustion flow of heated gas and the annular flow of attenuating air so that they are radially spaced apart at the level of the top row of orifices, and directing the annular combustion flow of heated gas and the annular flow of attenuating air so that they are brought together at a position below the top row of orifices.

According to this invention there is also provided an apparatus for forming fibers from molten mineral material. The apparatus comprises an annular burner and an associated combustion chamber. The combustion chamber has an annular chamber exit. The annular burner is configured to create a combustion flow of heated gas flowing through the annular chamber exit. A flame ring extends downward from the annular chamber exit. The flame ring has a downwardly extending flame ring lip. A spinner is mounted for rotation. The spinner has an orificed peripheral wall. The orificed peripheral wall has a top row of orifices. The spinner is configured to create a fan of primary fibers. An annular blower is configured to create an attenuating air flow sufficient to attenuate the primary fibers into secondary fibers. The flame ring lip is positioned to direct the combustion flow of heated gas and the attenuating air flow in a manner such that the combustion flow of heated gas and the attenuating air flow are radially spaced apart at the level of the top row of orifices, and are brought together at a position below the top row of orifices.

According to this invention there is also provided an apparatus for forming fibers from molten mineral material. The apparatus comprises an annular burner and an associated combustion chamber. The combustion chamber has an annular chamber exit. A spinner is mounted for rotation. The spinner has an orificed peripheral wall. The orificed peripheral wall has a top row of orifices. The spinner is configured to create a fan of primary fibers. An annular blower configured to attenuate the primary fibers into secondary fibers. The annular chamber exit is below the level of the top row of orifices by a distance in a range of from about 1.4 inches (35.6 mm) to about 1.6 inches (40.6 mm).

According to this invention there is also provided an apparatus for forming fibers from molten mineral material. The apparatus comprises an annular burner and an associated combustion chamber. The combustion chamber has an annular chamber exit. A flame ring extends vertically downward relative to the annular chamber exit. The flame ring has a flame ring bottom surface. A spinner is mounted for rotation. The spinner has an orificed peripheral wall. The orificed peripheral wall has a top row of orifices. The spinner is configured to create a fan of primary fibers. An annular blower is configured to attenuate the primary fibers into secondary fibers. The top row of orifices is at a level below the bottom surface of the flame ring by a distance in a range of from about 0.08 inches (2.0 mm) to about 0.10 inches (2.5 mm).

Various objects and advantages will become apparent to those skilled in the art from the following detailed description of the invention, when read in light of the accompanying drawings. It is to be expressly understood, however, that the drawings are for illustrative purposes and are not to be construed as defining the limits of the invention.

DETAILED DESCRIPTION OF THE INVENTION

Figure 1:
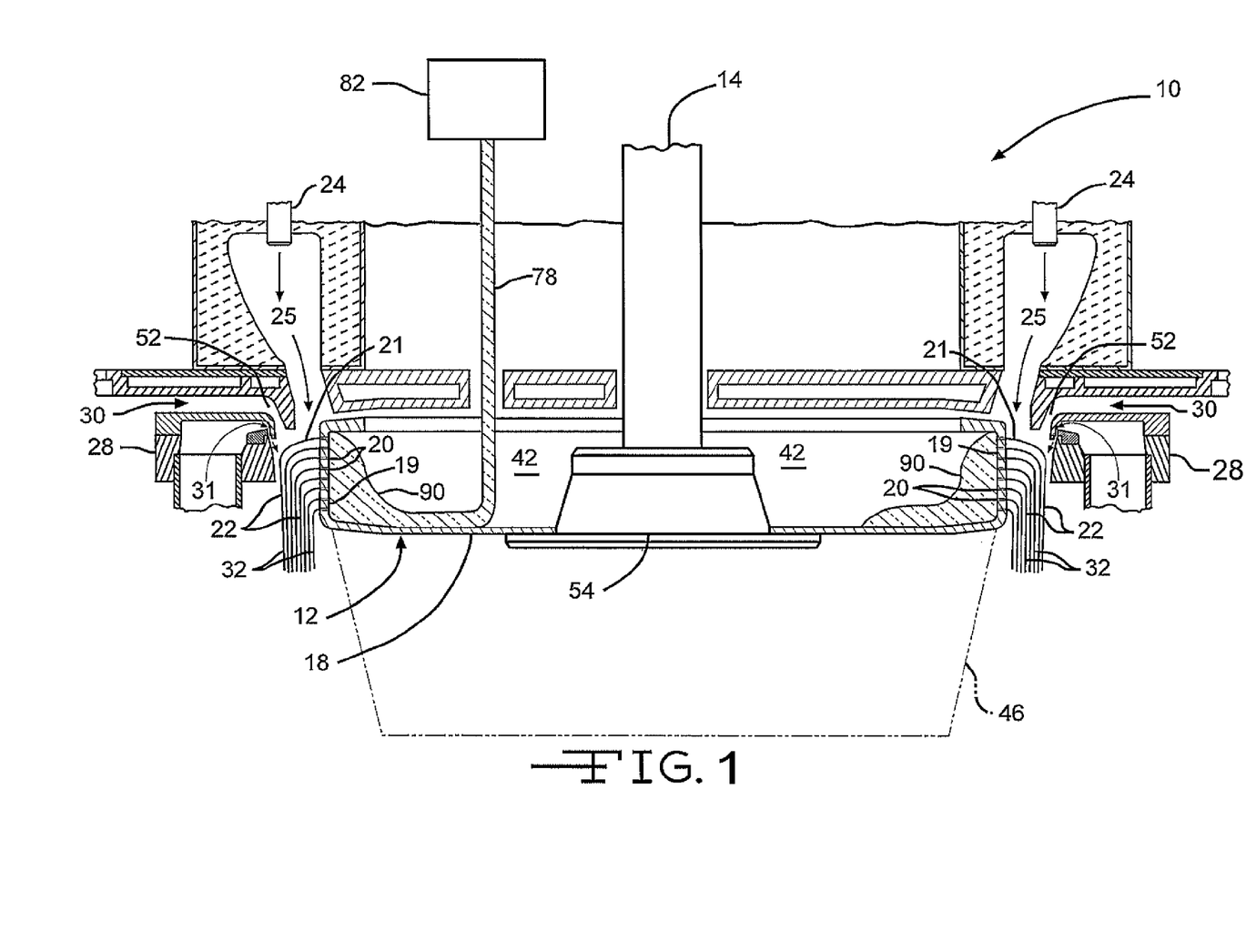
FIG. 1 is a cross-sectional view of a prior art rotary fiberizing system.

Referring now to the drawings, there is illustrated in FIG. 1, one example of a known fiberizing system, indicated generally at 10, for use in producing fibers from a mineral material. The fiberizer system 10 includes a spinner 12 attached to the lower end of a rotatable shaft or spindle 14. The spinner 12 can be attached to the spindle 14 in any suitable manner. In operation, the rotating spindle 14 causes the spinner 12 to rotate. The spinner 12 includes a spinner base 18 extending from spindle 14 to the peripheral wall 19. A plurality of orifices 20 are positioned through the peripheral wall 19. Typically, the spinner has approximately 20,000-40,000 orifices 20. Alternatively, the spinner can have more than 40,000 orifices or less than 20,000 orifices. The orifices 20 are configured to form primary fibers 22 as the molten mineral material is centrifuged out of the peripheral wall 19 of the spinner 12.

The spinner 12 is supplied with a stream 78 of a molten mineral material. One example of a molten mineral material is molten glass. Other examples of molten mineral materials include molten rock, slag and basalt.

A delivery mechanism 82 is used to supply the stream 78 of molten glass. The delivery mechanism 82 can be any mechanism, apparatus or structure, such as for example forehearths or channels, suitable to supply the stream 78 of molten glass from a furnace. The molten glass in stream 78 drops into a chamber 42 of spinner 12. In operation, the centrifugal force created by the rotating spinner 12 forces the molten glass in the chamber 42 against the peripheral wall 19 of the spinner 12. The molten glass forms a head 90 of molten glass adjacent to the peripheral wall 19 of the spinner 12. As the spinner continues to rotate, the molten glass is forced through the plurality of orifices 20 thereby forming a fan 21 of primary fibers 22. The term "fan" as used herein, is defined to mean a quantity of primary fibers emanating from the peripheral wall 19.

Referring again to FIG. 1, the primary fibers 22 are maintained in a soft, attenuable condition by the heat of an annular burner 24. As will be explained in more detail below, the annular burner 24 is configured to provide a combustion flow 25 of heated gas directed to the fan 21 of primary fibers 22. The annular burner 24 can be any structure or mechanism, such as for example a gas burner, sufficient to provide the combustion flow 25 of heated gas directed to the fan 21 of primary fibers 22.

As shown in FIG. 1, an annular blower 28 is configured to provide an attenuating air flow 31 through a plurality of blower apertures 52. The attenuating air flow 31 flowing through apertures 52 engages the primary fibers 22, thereby attenuating the primary fibers 22 to form secondary fibers 32. In the illustrated embodiment, the secondary fibers 32 are suitable for use in a product, such as wool insulating materials. The secondary fibers 32 are then collected on a conveyor (not shown) or other suitable apparatus for formation into a product, such as a glass wool pack. Alternatively, the secondary fibers 32 can be further processed in downstream operations (not shown).

Referring again to FIG. 1, an optional quill pan 46 is used to substantially cover the bottom of spinner 12. The quill pan 46 can have any shape sufficient to cover the bottom of the spinner 12. The spinner 12 and the quill pan 46 are mounted on a hub 54. The hub 54 is mounted for rotation with the lower end of spindle 14. The hub 54 can have any configuration suitable for rotation with the lower end of spindle 14.

Figure 2:
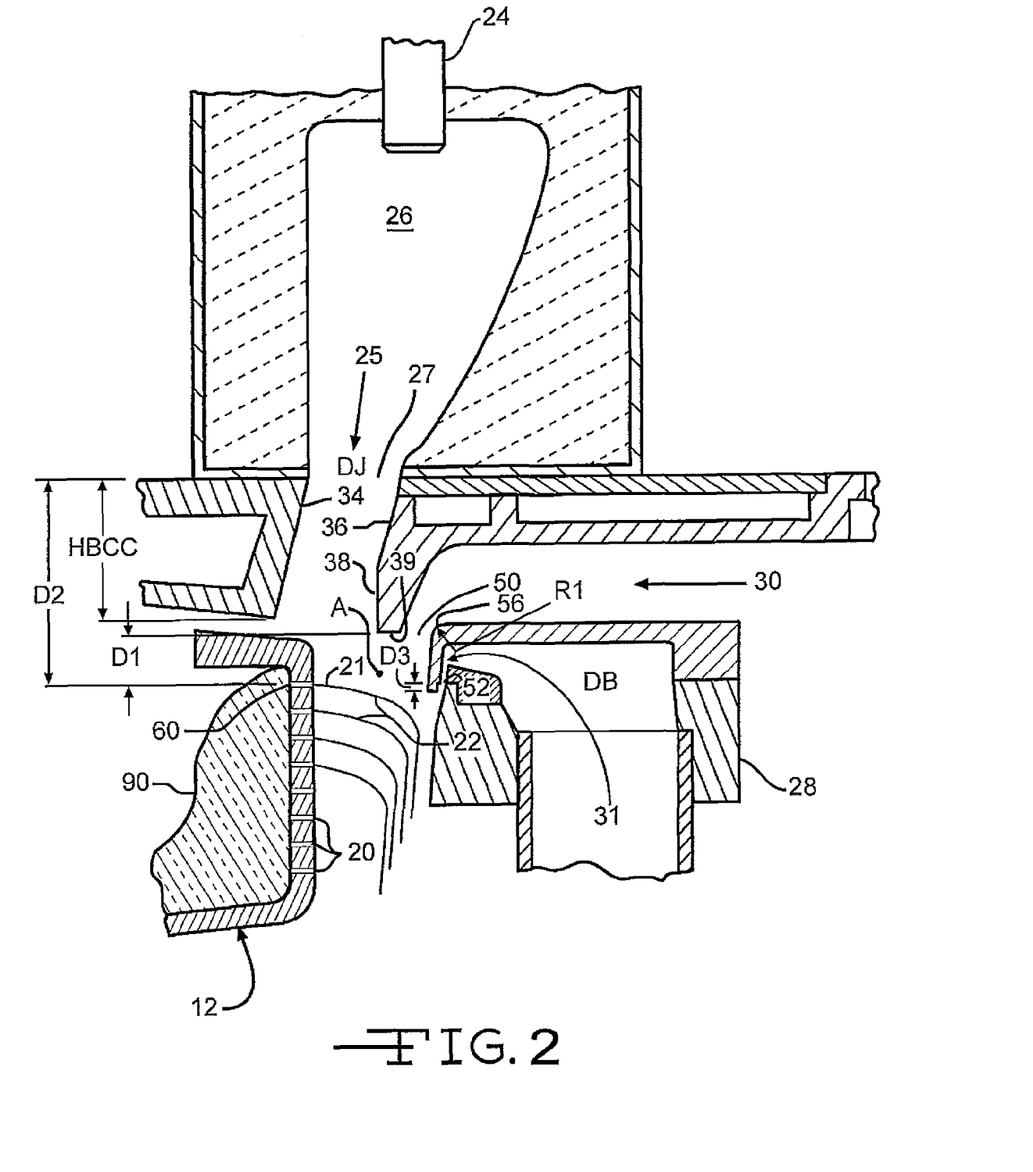
FIG. 2 is a cross-sectional view of a portion of the prior art rotary fiberizing system of FIG. 1.

Referring now to FIG. 2, the annular burner 24 is associated with a combustion chamber 26. The combustion chamber 26 includes an annular chamber exit 27. The annular burner 24 is configured within the combustion chamber 26 such that combustion within the combustion chamber 26 produces combustion flow 25 of heated gases in direction DJ through the annular chamber exit 27. While the annular burner 24 shown in FIG. 2 is positioned at the top of the combustion chamber 26, it should be understood that the annular burner 24 can be located in any position relative to the combustion chamber 26 sufficient to produce combustion flow 25 in direction DJ through the annular chamber exit 27.

As shown in FIG. 2, the combustion flow 25 flows in direction DJ along the bottom center casing 34 and the flame ring 36. The bottom center casing 34 has a height HBCC. In the illustrated embodiment, the height HBCC is approximately 1.5 inches (38.1 mm). The bottom center casing is a structural framework positioned between the spinner 12 and the annular burner 24.

The flame ring 36 is configured to direct the combustion flow 25 exiting the combustion chamber 26. The flame ring 36 includes a downwardly extending flame ring lip 38. The flame ring lip 38 has a bottom surface 39. The flame ring lip 38 extends downward relative to the chamber exit 27 for several purposes. First, the flame ring lip 38 creates a pinch area 50 in the passage 30 between the flame ring 36 and the blower 28. The pinch area 50 is configured to throttle the induced air flow flowing through the passage 30. Second, the flame ring lip 38 extends downward to separate the combustion flow 25 flowing from the combustion chamber 26 and the induced air flow flowing from the passage 30. Third, the flame ring lip 38 directs the combustion flow 25 flowing from the combustion chamber 26 in the direction that will intersect the fan 21 of primary fibers 22.

As shown in FIG. 2, the blower 28 includes a plurality of apertures 52. The blower 28 is configured to provide an attenuating air flow 31, in direction DB, through the apertures 52. The attenuating air flow 31 flowing through apertures 52 engages the primary fibers 22, thereby attenuating the primary fibers 22 to form secondary fibers 32.

Referring again to FIG. 2, the orifices 20 are configured to form the fan 21 of primary fibers 22 as the centrifugal force of the spinner 12 forces the molten glass through the orifices 20. The orifices 20 can be formed in rows, with a top row 60. A first distance D1 is formed between the top row of orifices 60 and the bottom surface 39 of the flame ring 38. In the illustrated embodiment, the first distance D1 is approximately 0.406 inches (10.3 mm).

As shown in FIG. 2, a second distance D2 is formed between the top row of orifices 60 and the chamber exit 27. In the illustrated embodiment, the second distance D2 is approximately 1.856 inches (47.1 mm).

Referring again to FIG. 2, a third distance D3 is formed between the top row of orifices 60 and the apertures 52 in the blower 28. In the illustrated embodiment, the distance D3 is approximately 0.097 inches (2.5 mm).

As shown in FIG. 2, the combustion flow 25 and the induced air flow are initially radially spaced apart by the flame ring lip 38. In the illustrated embodiment, the combustion flow 25 and the induced air flow are brought together at a Point A, which is positioned vertically above the top row of orifices 60.

Figure 3:
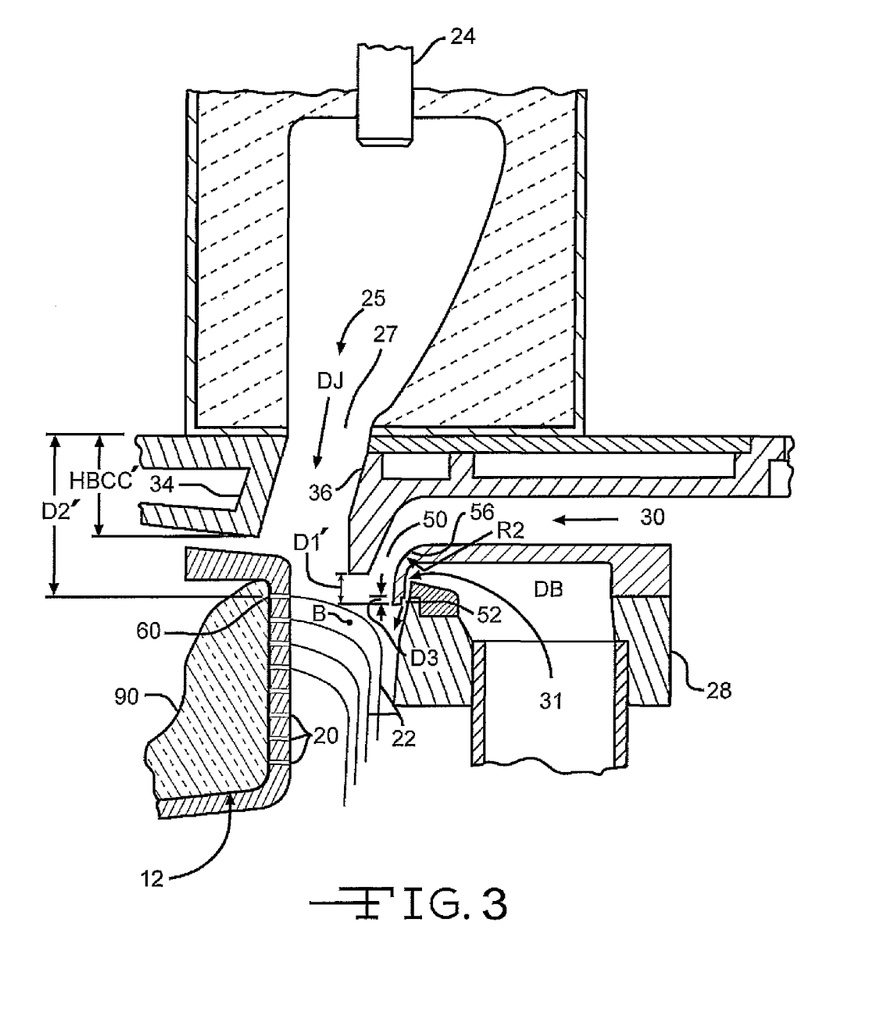
FIG. 3 is a cross-sectional view of the present invention showing a rotary fiberizing system.

Referring now to FIG. 3, the fiberizer system 10 includes a spinner 12 and the blower 28 moved vertically upward relative to the chamber exit 27. Moving the spinner 12 and the blower 28 vertically upward relative to the chamber exit 27 allows the top row of orifices 60 and the resulting fan 21 of the primary fibers 22 to be positioned closer to the flame ring 38. Positioning the orifices 60 and the primary fibers 22 vertically closer to the chamber exit 27 results in a significant and unexpected improvement in the efficiency of the fiberizing process. One possible reason for the improvement in the efficiency of the fiberizing process could be that the combustion flow 25 flowing from the combustion chamber 26 flows substantially through the fan 21 of the primary fibers 22 prior to mixing with the induced air flow. Since the combustion flow 25 moves substantially through the fan 21 of primary fibers 22 prior to mixing with the induced air flow, an increased amount of heat is transferred to the primary fibers 22.

The improvement in the efficiency of the fiberizing process can manifest itself in several ways. First, primary fibers, having the same fiber diameter, can be produced using less energy in the annular burner. Using less energy in the annular burner results in a cost savings. Second, the diameter of the resulting secondary fibers 32 can be reduced for a given level of annular burner energy. Trial results have shown a reduction in fiber diameter of about 1.2 HT (hundred thousanths of an inch) (0.3 microns) at constant gas flow, and alternatively a gas flow reduction of up to 20% at constant fiber diameter. Lastly, a combination of using less energy in the annular burner and a reduction in the fiber diameter can be realized.

As shown in FIG. 3, a first distance D1' is formed between the new position of the top row of orifices 60 and the bottom surface 39 of the flame ring 38. In the illustrated embodiment, the first distance D1' is approximately 0.0935 inches (2.4 mm). In other embodiments, the first distance D1' can be in a range from about 0.08 inches (2.0 mm) to about 0.10 inches (2.5 mm).

As shown in FIG. 3, a second distance D2' is formed between the new position of the top row of orifices 60 and the chamber exit 27. In the illustrated embodiment, the second distance D2' is approximately 1.544 inches (39.2 mm). In other embodiments, the first distance D2' can be in a range from about 1.4 inches (35.6 mm) to about 1.6 inches (40.6 mm).

Referring again to FIG. 3, a third distance D3' is formed between the new position of the top row of orifices 60 and the apertures 52 in the blower 28. In the illustrated embodiment, the distance D3' is approximately 0.160 inches (4.1 mm).

Referring again to FIG. 3, the vertical upward movement of the spinner 12 relative to the chamber exit 27 is accomplished by a reduction in the height HBCC of the bottom center casing 34. In the illustrated embodiment, the height HBCC of the bottom center casing 34 has been reduced by approximately 0.3125 inches (7.9 mm) to a revised height HBCC' of approximately 1.200 inches (30.5 mm). In other embodiments, the height HBCC of the bottom center casing 34 can be reduced by more or less than 0.3125 inches (7.9 mm). In other embodiments, the vertical upward movement of the spinner 12 can be accomplished in other manners.

Figure 3A:
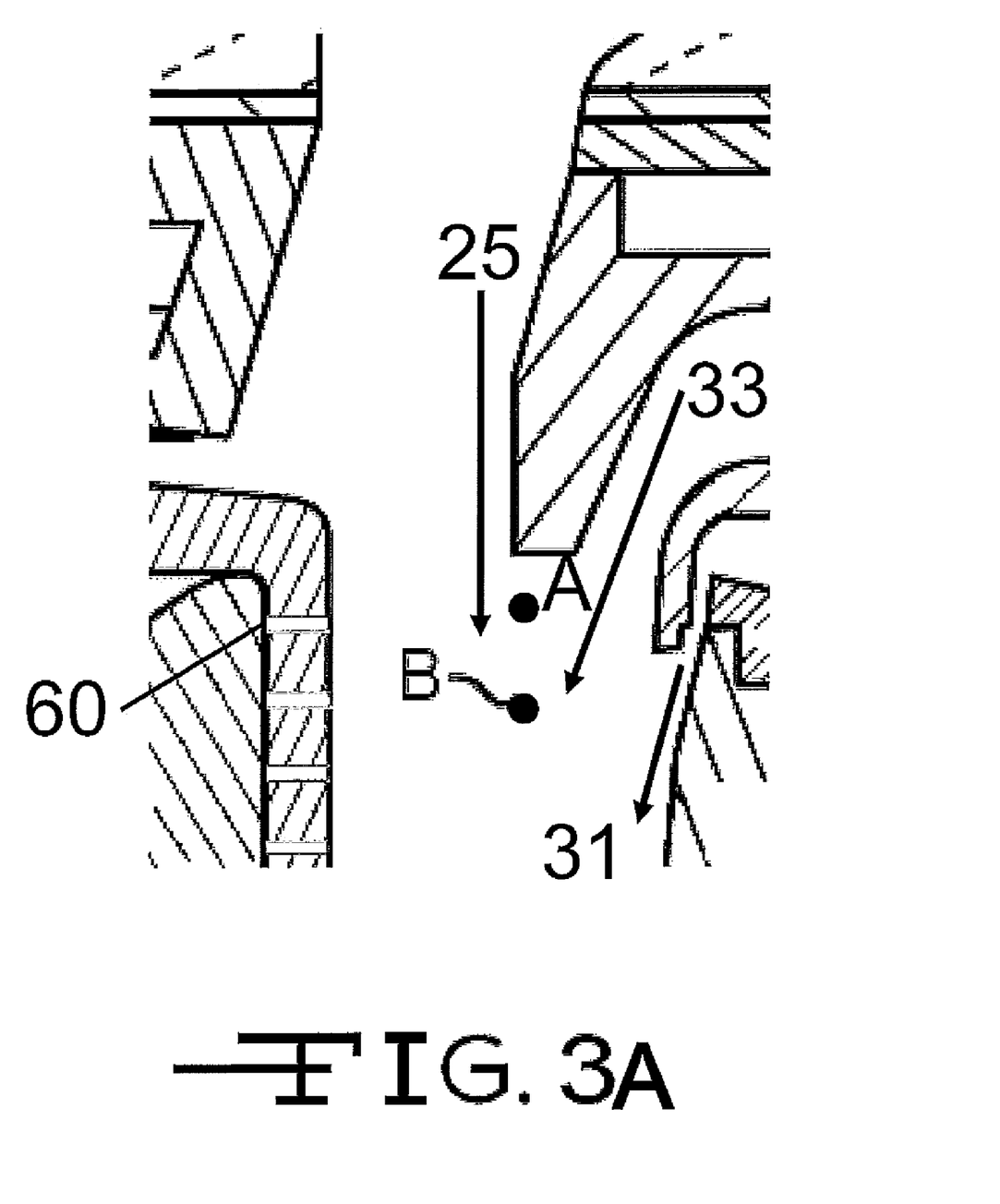
FIG. 3A is a enlarged cross-sectional view of a portion of the fiberizing system of FIG. 3.

Referring now to FIG. 3A, the combustion flow 25 and an induced air flow 33 are radially spaced apart at Point A by the flame ring lip 38. The combustion flow 25 and the induced air flow 33 remain radially spaced apart until the combustion flow 25 and the induced air flow 33 are brought together at Point B, which is positioned at a level vertically below the level of the top row of orifices 60.

Referring again to FIG. 2, the blower 28 has an upper inside corner 56, helping to define passage 30. The upper inside corner 56 of the blower 28 has a radius R1. Referring now to FIG. 3, the upper inside corner 56 of the blower 28 has been modified to have a radius R2. In the illustrated embodiment, the radius R2 is larger than the radius R1 such that the pinch area 50 can be maintained at a desirable throttling level. In other embodiments, the vertical movement of the blower 28 can be accomplished in other manners.

Figure 4:
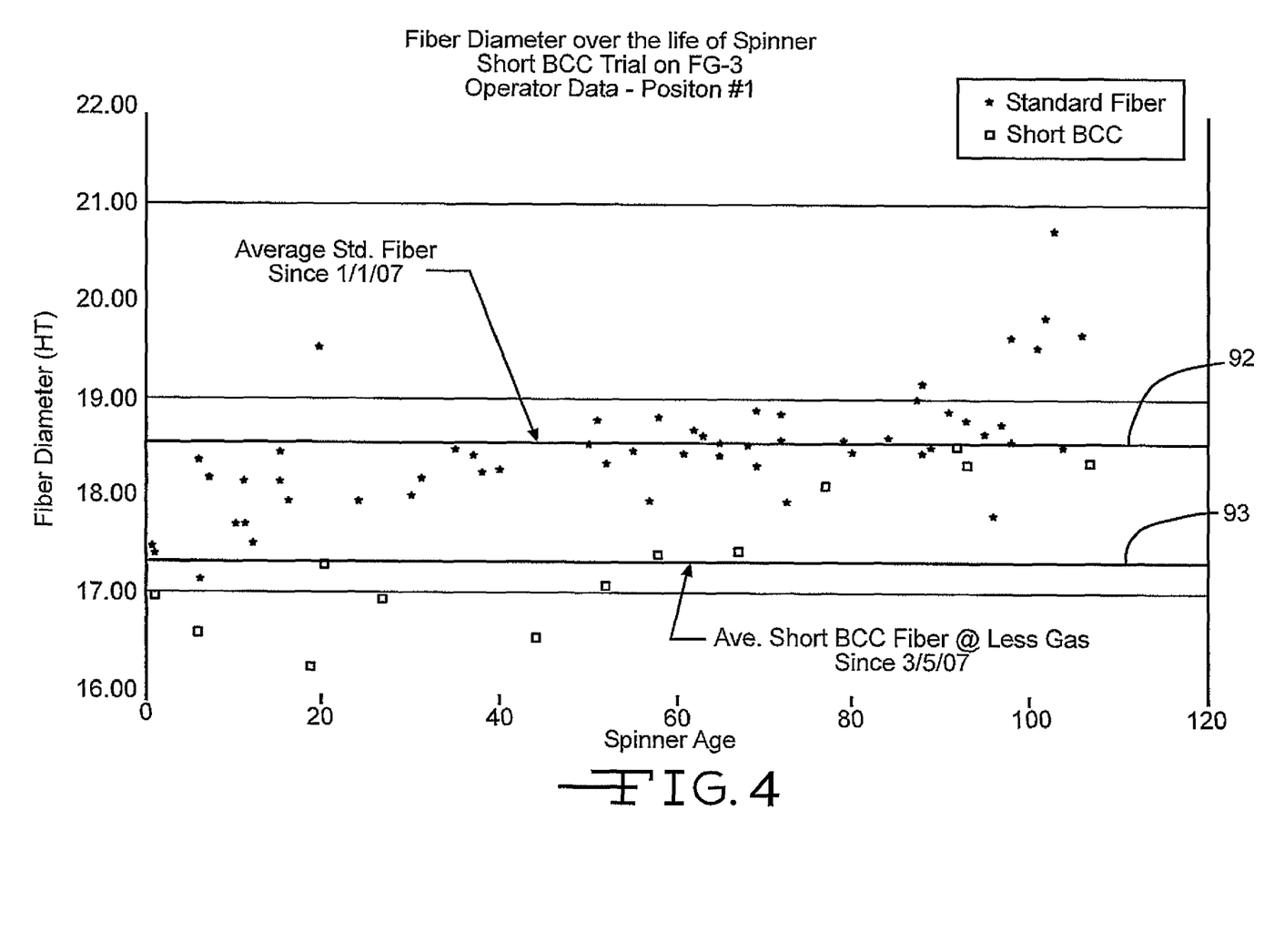
FIG. 4 is a graph comparing the fiber diameter of glass fibers produced by the prior art fiberizing system of FIG. 1 with glass fibers from the fiberizing system of FIG. 3.

As described above, trial results have shown a reduction in fiber diameter of about 1.2 HT (hundred thousanths of an inch) (0.3 microns) at constant gas flow. As shown in FIG. 4, an average fiber diameter of approximately 18.6 HT (4.6 microns) (as shown by curve 92) was realized prior to the movement of the spinner 12 and the blower 28. After movement of the spinner 12 and the blower 28, an average fiber diameter of approximately 17.4 HT (4.4 microns) (as shown by curve 93) was realized.

The R-value of an insulation batt can be determined by the thickness (T) of the fibrous insulation and the thermal conductivity (k) using Equation 1.

$$R = \frac{T}{k} \qquad (1)$$

R-value may be increased by decreasing the thermal conductivity, k, of the insulation. Decreased k-values are typically obtained by increasing the density of the insulation or by decreasing the fiber diameter of the insulation.

It is clear from the data shown in FIG. 4 that the fiber diameter reduction occurs at a constant gas flow and the k-value is expected to decrease; however, the k-value is reduced even further than the expected reduction as shown by the reduction in thermal conductivity (k) below the expected k-value shown in the k curve of FIG. 4 found in U.S. Patent Application Publication No. 2007-0000286, which is hereby incorporated by reference in its entirety. Thermal conductivity is measured in k-points where a k-point is a change in the third decimal of the overall k-value. As shown in Eq. 1 (above) an improvement (i.e. reduction) in k-value causes an improvement in overall insulation or R-value. Large producers of insulation glass fibers may produce hundreds of millions or billions of pounds of insulation in a year so even small improvements in k-value lead to dramatic savings in material costs.

Figure 5:
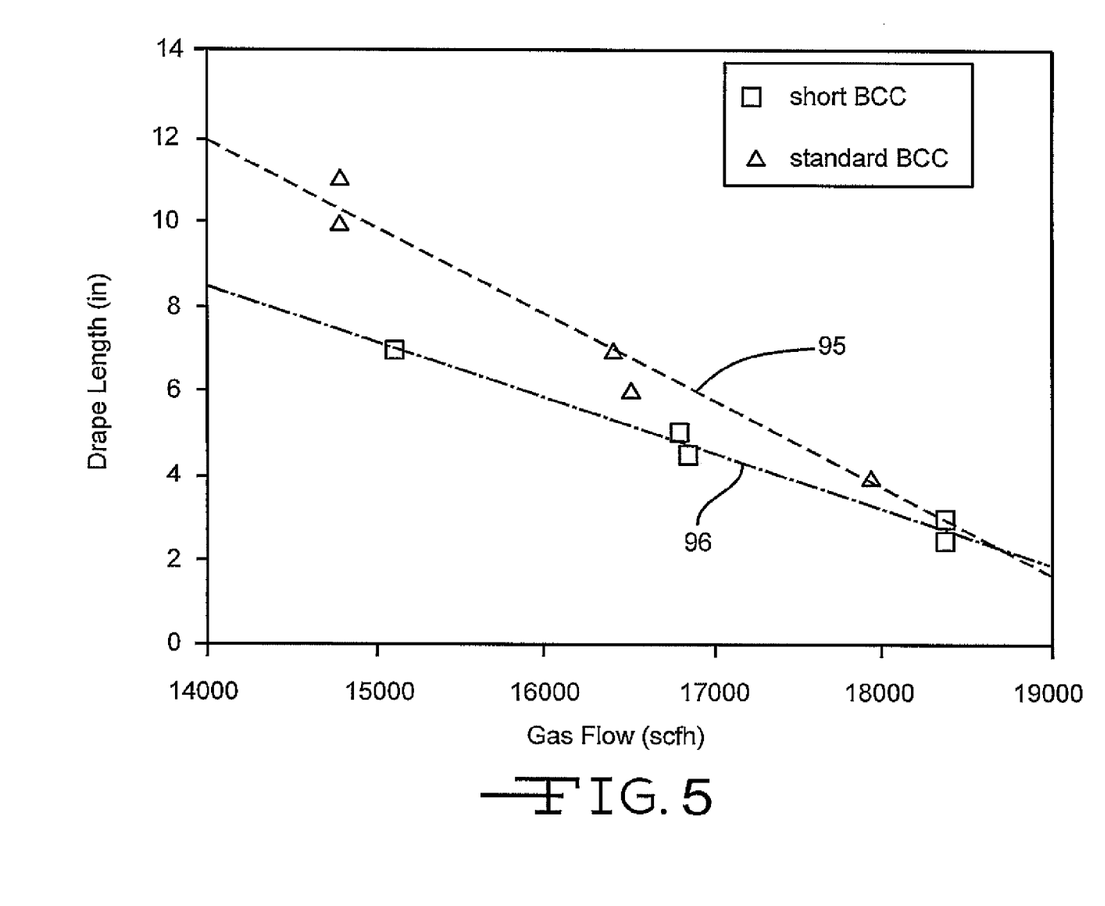
FIG. 5 is a graph comparing the drape length of fibers produced by the prior art fiberizing system of FIG. 1 with fibers from the fiberizing system of FIG. 3.

An additional unexpected benefit of the fiberizer system 10 is shown in the data of FIG. 5. As shown in FIG. 5, the drape length of the resulting fibers of the fiberizing system prior to the vertical movement of the spinner 12 and blower 28 was higher (as shown by curve 95) at various levels of gas flow than the drape length of the resulting fibers of the fiberizing system after the vertical movement of the spinner 12 and blower 28 (as shown in curve 96).

The principles and mode of operation of this invention have been described in its preferred embodiments. However, it should be noted that the rotary fiberizer may be practiced otherwise than as specifically illustrated and described without departing from its scope.

What is claimed is:
1. A method of forming fibers from molten mineral material, the method comprising the steps of:
    rotating a spinner, the spinner having an orificed peripheral wall, the orificed peripheral wall having a top row of orifices;
    introducing molten mineral material to the spinner to create a fan of primary glass fibers;
    creating an annular combustion flow of heated gas with an annular burner and directing the annular combustion flow of heated gas substantially through the primary fibers, the annular burner having an exit and apertures, wherein the annular burner exit is positioned above the top row of orifices by a distance in a range of from about 1.40 inches (35.6 mm) to about 1.60 inches (40.6 mm) and the annular blower apertures are positioned a distance from the top row of orifices of about 0.160 inches (4.1 mm);
    positioning a bottom center casing between the annular burner and the spinner such that a top surface of the bottom center casing is below a bottom of the annular burner and a bottom surface of the bottom center casing is above a top of the spinner, wherein the bottom center casing has a thickness of about 1.2 inches (30.5 mm);

creating an annular flow of induced air in a passage positioned between the annular burner and an annular blower;

directing the annular combustion flow of heated gas and the annular flow of induced air so that they are radially spaced apart at the level of the top row of orifices; and directing the annular combustion flow of heated gas and the annular flow of induced air so that they are brought together at a position below the top row of orifices.

2. The method of claim 1 in which the annular combustion flow of heated gas and the annular flow of induced air are initially radially spaced apart at the level of a flame ring.

3. The method of claim 2 in which the flame ring includes a flame ring lip having a bottom surface.

4. The method of claim 3 in which the bottom surface of the flame ring is above the top row of orifices by a distance in a range from about 0.08 inches (2.0 mm) to about 0.10 inches (2.5 mm).

5. The method of claim 1, wherein the annular combustion flow flows substantially through the fan of primary glass fibers prior to mixing with the annular flow of induced air.

* * * * *